Dec. 1, 1953  D. S. McCHESNEY  2,660,920
FLAT FILM VIEWER
Filed Oct. 25, 1950  7 Sheets-Sheet 1

FIG. 1

INVENTOR:
Donald S. McChesney,
BY
Bodell & Thompson
ATTORNEYS.

Dec. 1, 1953     D. S. McCHESNEY     2,660,920
FLAT FILM VIEWER Filed Oct. 25, 1950     7 Sheets-Sheet 5

_Fig_5_

INVENTOR:
Donald S. McChesney,
BY
Bodell & Thompson
ATTORNEYS.

Dec. 1, 1953   D. S. McCHESNEY   2,660,920
FLAT FILM VIEWER
Filed Oct. 25, 1950   7 Sheets-Sheet 6

Fig. 6.

INVENTOR:
Donald S. McChesney,
BY
Bodell & Thompson
ATTORNEYS.

Patented Dec. 1, 1953

2,660,920

UNITED STATES PATENT OFFICE 2,660,920

FLAT FILM VIEWER

Donald S. McChesney, Solvay, N. Y., assignor to Hall & McChesney, Inc., Syracuse, N. Y., a corporation of New York Application October 25, 1950, Serial No. 192,007

5 Claims. (Cl. 88—24)

This invention relates to apparatus for viewing an image on a flat film having a multiplicity of images arranged in vertical and horizontally extending rows.

More particularly the invention relates to a viewing apparatus of the type referred to intended for use in recording offices, such as the offices of county clerks, for viewing recorded instruments which have been recorded by being photographed on a film with great reduction.

Due to the tremendous mass of instruments that have been placed on record for the past century and a half, many recording offices are now badly pressed for storage space and particularly for the storage of recorded instruments in such a manner that they can be conveniently referred to by search clerks and other persons having occasion to consult them.

In some instances, the older recorded instruments are being reproduced on what is generally known as micro-film. In this process, the instrument is photographed and the film or portion of the film containing the photograph or image of one page of the document is only a matter of a fraction of an inch in length and width. Accordingly, in order to inspect this small image, it is necessary to project the image on a relatively large screen.

This invention has as an object an apparatus embodying a structural arrangement by which a micro image on a flat film containing several hundred of such images may be quickly selected and projected upon a viewing screen, the arrangement embodying a particularly simple and economically manufactured structure which can be conveniently manipulated by any person without the necessity of special instructions or training.

The invention consists in the novel features and in the combinations and constructions hereinafter set forth and claimed.

In describing this invention, reference is had to the accompanying drawings in which like characters designate corresponding parts in all the views.

The apparatus is mounted in an irregular shaped cabinet having a rear portion 10 of rectangular form and in which the film is mounted for movement in directions lengthwise and transversely of the film. The cabinet further includes a forwardly extending portion 11, in the forward end of which there is mounted a viewing screen 12 and a smaller forwardly extending portion 13, in which is mounted the dialing apparatus for moving the film in the selection of the desired image. The light source is provided in a housing 14 arranged in the rear of the cabinet portion 10 and supported by a bracket 15.

Figure 1:
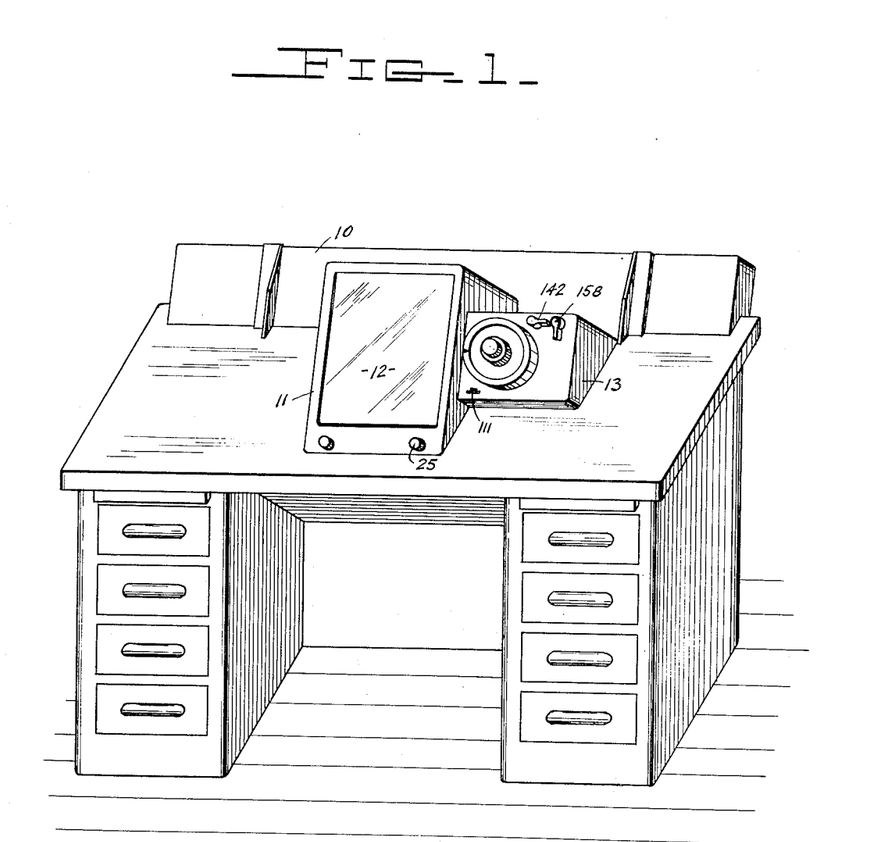
Figure 1 is a perspective view of an apparatus embodying my invention.
Figure 2:
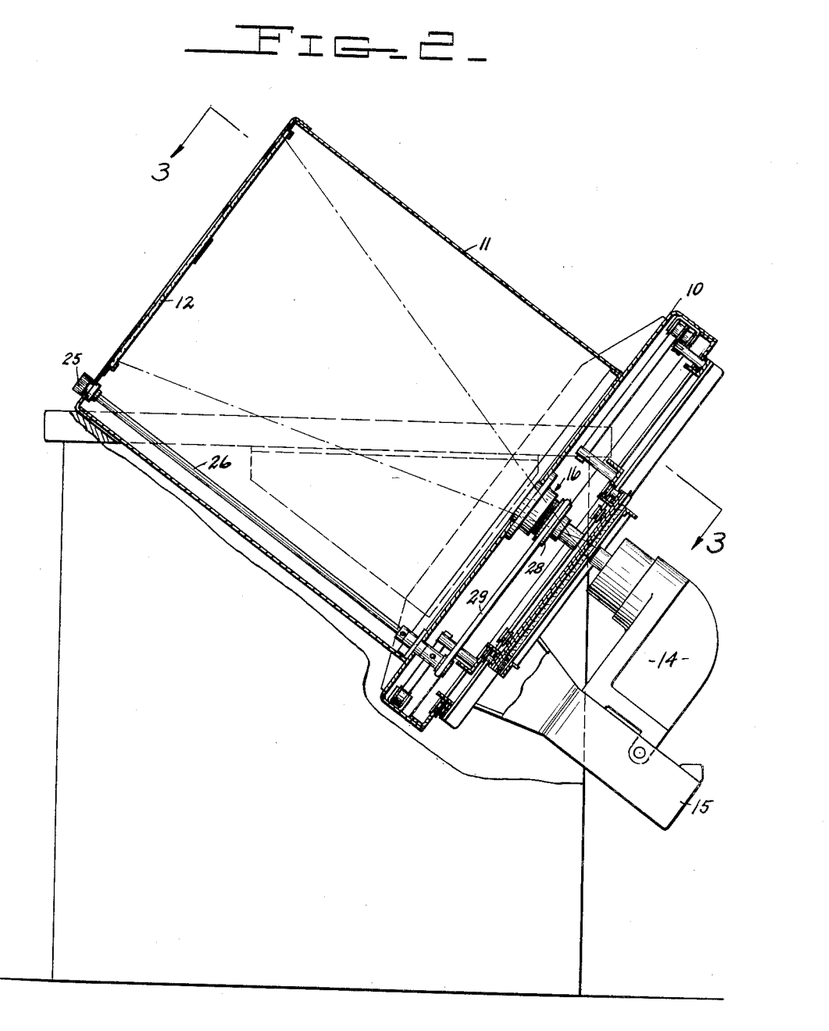
Figure 2 is an end elevational view with parts broken away and parts in section.
Figure 3:
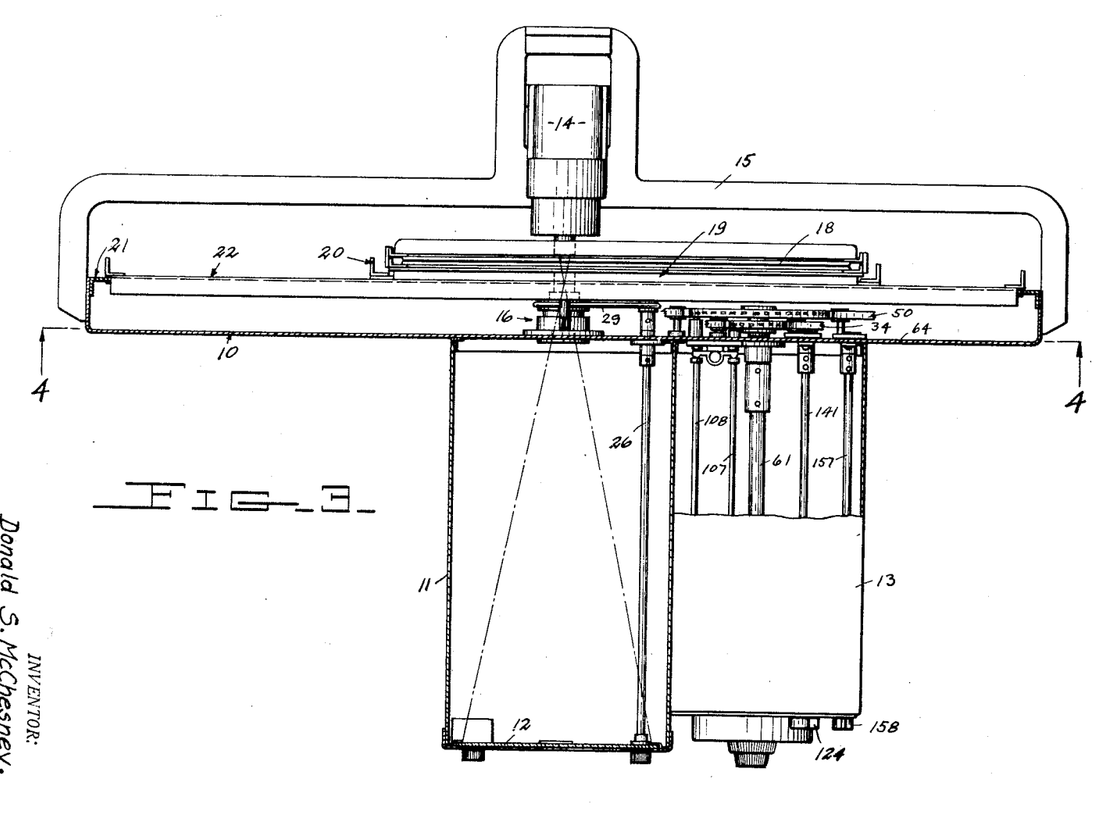
Figure 3 is a view taken on line 3—3, Figure 2.
Figure 4:
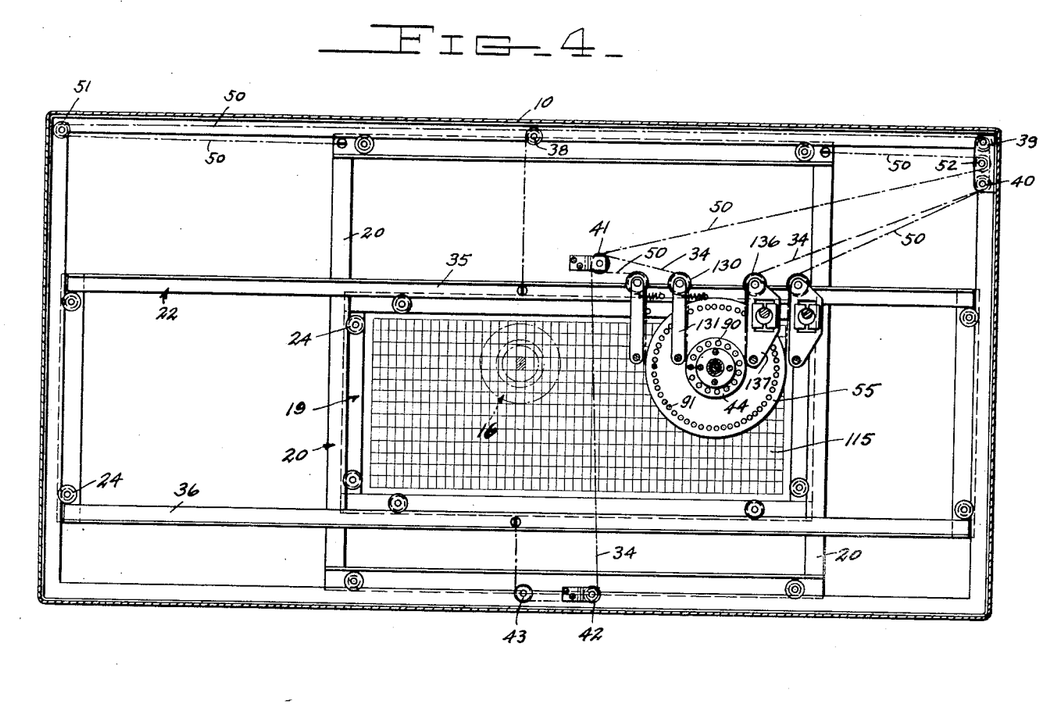
Figure 4 is a view taken on line 4—4, Figure 3.

An optical system designated generally at 16 is mounted on the inner wall of the cabinet portion 11. The film 18, Figure 4, is mounted in a frame 19 arranged for vertical and horizontal movements. The frame 19 is mounted for vertical movement in a frame 20 which, in turn, is mounted for lateral movement in a stationary frame 21.

The frame 19 is also mounted for transverse movement in a frame 22 which, in turn, is mounted for vertical movement in the stationary frame 21. The movable frames 19, 20, 22, are provided with antifriction rollers 24, whereby these frames are easily movable without chatter or shaking during their movement. The frame 19 is provided with means for detachably mounting the film 18.

The light source in the housing 14 is arranged to project a beam on the screen 12, this beam passing through the optical system 16 which functions to diverge the beam so that it substantially covers the screen 12.

The film frame 19 and the frames 20, 21, 22, in which it is mounted are arranged in the rear portion 10 of the cabinet with the film positioned intermediate the light source and the optical system 16, whereby an image on the film is projected and enlarged onto the screen 12. The optical system 16 is adjustable to correct the focus by a knob 25 mounted on the end of a shaft 26 journalled in the cabinet portion 11 and exposed on the forward face thereof. The inner end of the shaft 26 is connected to a movable member 23 of the optical system by a belt 28. With this arrangement, the optical system may be adjusted by the control knob 25.

The film carrying frame 19 is moved vertically by a flexible band 34, the ends of which are secured to the upper and lower side rails 35, 36, of the frame 22 and being trained about fixed idler rolls 38, 39, 40, 41, 42 and 43, see Figure 4. The intermediate portion of this band is trained about a drum 44 journalled for rotation in the cabinet. The band 34 is preferably formed of flexible sheet metal and uniformly perforated to receive teeth 45 formed on the periphery of the drum 44 in order to eliminate slippage between the band and the drum.

The frame 19 is moved in a direction lengthwise of the film by a band 50 trained about fixed idler rolls 51, 39, 52, 41, 40, 52, the ends of the bands being connected to the upper corners of frame 20. The intermediate portion of the band 50 is looped about a drum 55 likewise provided with teeth 56 on its periphery to engage perforations in the band 50.

Figure 6:
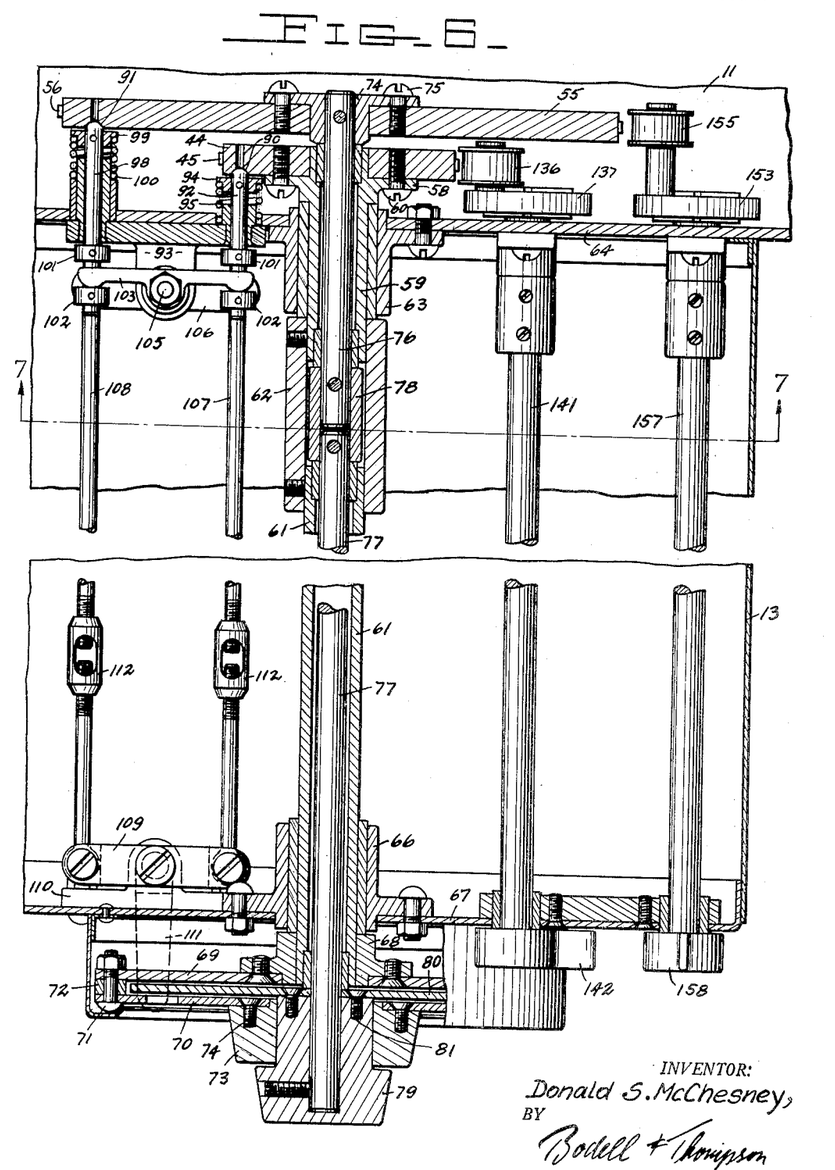
Figure 6 is an enlarged view taken on line 6—6, Figure 5.

The drums 44, 55, are shown as being mounted coaxially, Figure 6. The drum 44 is fixed to the hub portion 58 of a sleeve 59, as by screws 60. The sleeve 59 is connected to a tubular shaft 61 by a connecting collar 62. The sleeve 59 is journalled in a bearing 63 mounted in the wall 64 of portion 10 of the cabinet. The outer end of the tubular shaft 61 is journalled in a bearing 66 mounted in the front wall 67 of the cabinet portion 13. A hub member 68 is fixed to the outer end of the tubular shaft 61 and carries a disk 69. A second disk 70 is mounted on the disk 69 by screws 71 and spacer blocks 72. An operating knob 73 is mounted on the central portion of the disk 70 by screws 74.

The drum 55 is fixed to a hub member 74 by screws 75 and the hub member is pinned to the inner end of a shaft 76 journalled in the sleeve 59. The shaft 76 is connected to a shaft 77 by a coupling 78, the shaft 77 extending within the tubular shaft 61 and being provided at its outer end with an operating knob 79. This knob has affixed to it a disk 80, as by screws 81, the disk 80 constituting a dial arranged intermediate the disks 69, 70, see Figure 6. With this arrangement, rotation is imparted to the drums 44, 55, by the knob 73, 79, respectively.

It will be apparent that upon rotation of the knob 79 and drum 55, the frame 19 is adjustable in a direction lengthwise of the film, or horizontally in Figure 4 of the drawings. On the other hand, rotation of the knob 73 effects movement of the film in a transverse direction or vertically corresponding to the showing in Figure 4.

Figure 7:
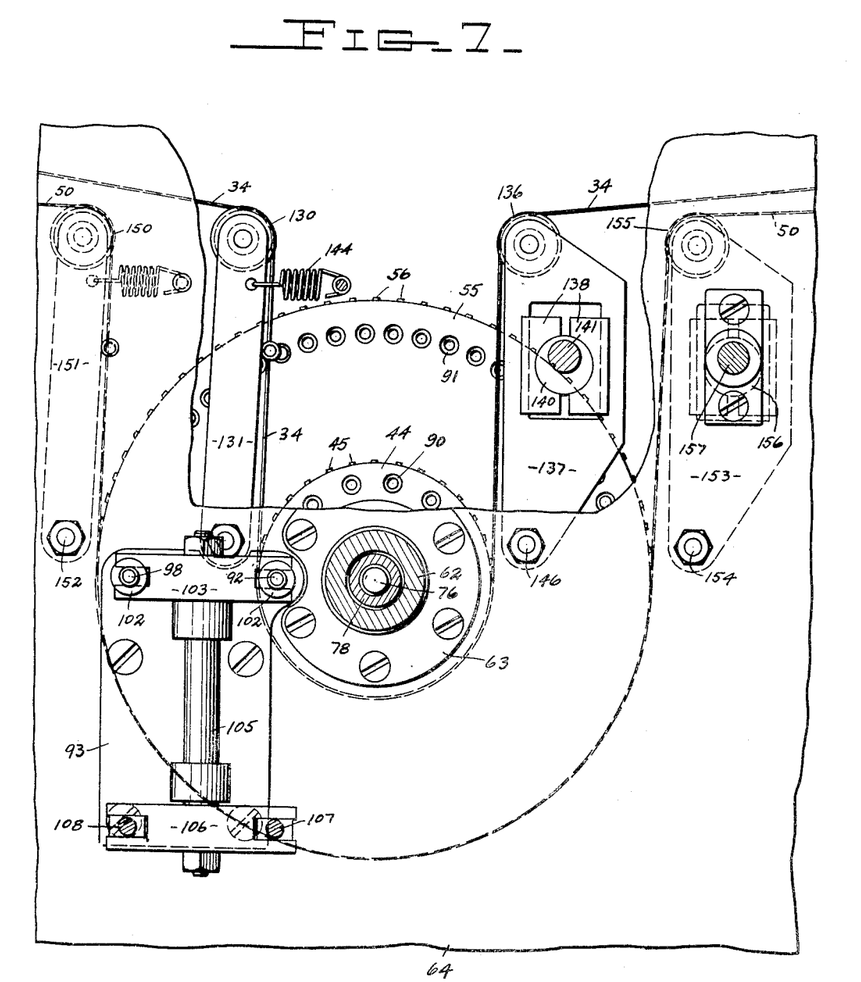
Figure 7 is a view taken on line 7—7, Figure 6.

Structure is provided for locking the drums 44, 55, against rotation and for individually releasing the drums for rotation. The drum 44 is formed with an annular series of depressions 90, and the drum 55 with a similar series 91. A stop pin 92 is slidably mounted in the base of a bracket 93 for engagement with the recesses 90 in the drum 44. A collar 94 is affixed to the end of the pin 92 contiguous to the drum, and a coil compression spring 95 acts against the collar 94 to yieldingly urge the pin into locking engagement with the drum, see Figure 6. A similar pin 98 is arranged for engagement with the recesses 91 in the drum 55, this pin having a collar 99 acted upon by the compression spring 100. The opposite ends of the pins 92, 98, are provided with pairs of spaced collars 101, 102. A yoke 103 is pivotally mounted intermediate its ends to the bracket 93 and with its ends arranged intermediate the pairs of collars 101, 102. The yoke 103 is affixed to the upper end of a shaft 105, to the lower end of which there is attached a second yoke 106. The ends of this yoke are connected to rods 107, 108, Figures 6 and 7, and the opposite ends of the rods 107, 108, are connected to the ends of a yoke 109 journalled intermediate its ends to a bracket 110 secured to the plate 67 of the cabinet. The yoke 109 has connected to it a handle 111 which extends outwardly through the face of the cabinet.

When it is desired to unlock the drum 44, the handle 111 is moved to the left, moving the rod 107 outwardly and effecting clockwise rotation of the yoke 103, Figure 6, and in turn effecting outward movement of the pin 92 by engagement with the collar 102. The collars 101, 102 are spaced apart axially a sufficient distance to permit inward movement of one end of the yoke 103 a sufficient distance to cause the other end of the yoke to withdraw the associated pin 92, 98 from engagement with the drums 44, 55. Movement of the handle 111 to the right will effect withdrawal of the lock pin 98, as will be apparent. The rods 107, 108, are provided with turn buckles 112 to effect proper adjustment of the operating linkage described.

As previously stated, the individual images or frames on the film 18, indicated in Figure 4 by the small rectangular outlines 115, are in actual practise only a fractional part of an inch in dimension. Accordingly, a very slight movement imparted to the film frame 19 will move a selected image out of proper registration with the optical system 16. The purpose of the knobs 73, 79, is to quickly move the frame 18 to bring a desired one of the images 115 into registration with the optical system of the apparatus. For this purpose, the dials 70, 80, are provided with indicia for indicating the particular image in registration with the optical system. The dial 80 has printed on the face thereof numbers indicating the number of the image in a laterally extending row on the film.

The dial 70 may be formed of transparent material, or of opaque material, with apertures through which the indicia on the inner dial 80 may be viewed. The outer dial 70 has indicia at each aperture indicating the number of the horizontal row of images on the film. There is an inner annular series 116 of these apertures, and an outer annular series 117. The film illustrated in Figure 4 contains fifty images in each horizontal row numbering from 0 to 49 inclusive in the top row, 50 to 99 inclusive in the next row down, etc. There are fifteen horizontal rows.

Figure 5:
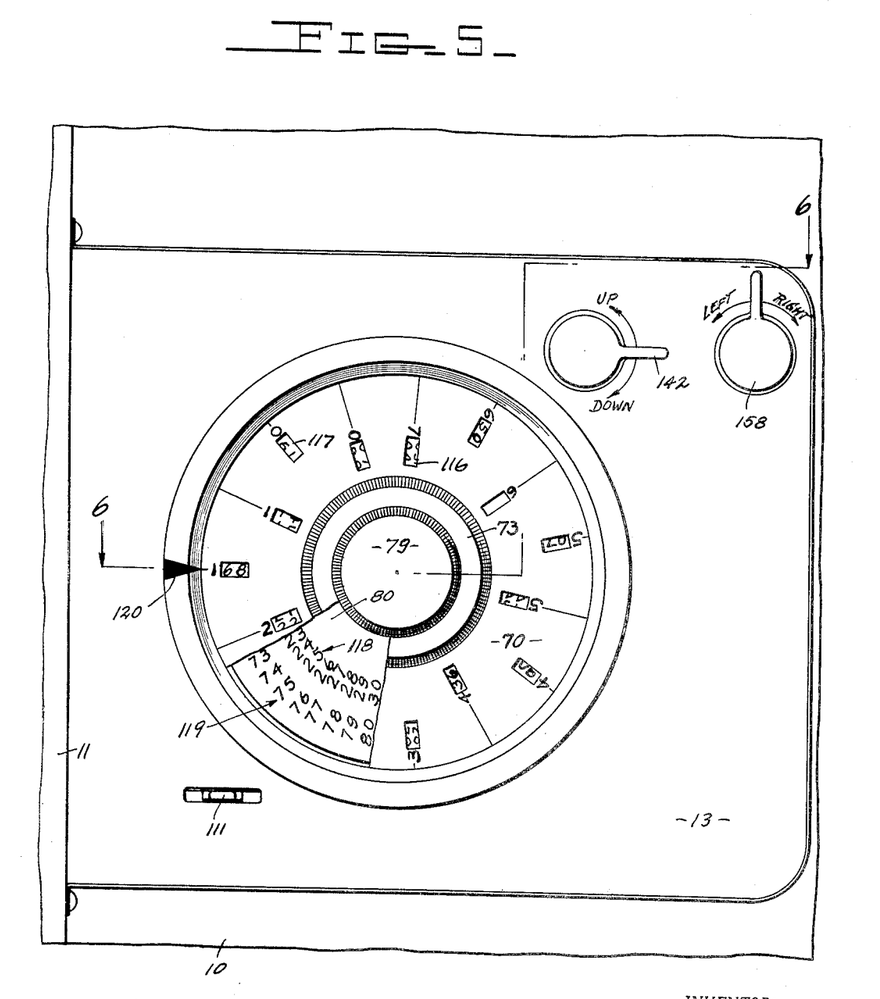
Figure 5 is an enlarged elevational view of the dialing mechanism.

The inner dial 80 is provided with an inner annular series of numbers 118 running from 0 to 49 inclusive, and an outer annular series 119 running from 50 to 99 inclusive. The inner apertures 116 in the outer dial 70 are arranged in register with the inner series of numbers 118 on the dial 80. Likewise, the outer series of apertures 117 are arranged in register with the outer series of numbers 119. The inner series of apertures 116 are numbered on the outer dial 70 from 0 to 7 inclusive. The outer apertures 117 are numbered 0 to 6 inclusive, see Figure 5. These numbers arranged in juxtaposition to the apertures 116, 117, from the first digit in the number of the image desired to be positioned in the focal axis of the reader. If the desired image is No. 168, the outer dial is turned to aline the aperture having the number 1 in juxtaposition thereto. Because the next two digits of the number of the image desired are 6, 8 the dial 70 will be turned to aline the number 1 aperture in the outer series 117 with the arrow 120. The inner dial 80 will then be rotated to bring the number 68 into register with that aperture. These movements of the dials will move the film frame 19 vertically and horizontally to bring the 18th image in the fourth horizontal row from the top of the film.

This manipulation of the drums 44, 55, as previously stated, is to conveniently bring a selected one of the images into juxtaposition with the focal axis of the optical system. It may not position the selected image in perfect and satisfactory registration with the focal axis of the optical system. This inaccuracy may result from manufacturing tolerances necessitated in the viewing apparatus, changes in the film due to humidity, and other causes which can not be overcome by rotation of the frame moving drums 44, 55.

The apparatus includes however a structure by which a minute movement can be imparted to the film in a direction lengthwise or transversely thereof.

The band 34 is trained over a roller 130, the roller engaging the band intermediate the drum 44 and the bottom rail 36 of the frame 22. This roller is journalled in the end of an arm 131, the lower end of which is pivotally mounted in the plate 64 of the cabinet. The arm 131 is yieldingly moved about its pivot to cause the roller 130 to place a tension on the band 34. A portion of the band 34 on the opposite side of the drum 44 is engaged by a similar roller 136 journalled in an arm 137 pivotally mounted upon the plate 64. The arm 137 is provided intermediate its ends with a rectangular shaped aperture in which there is slidably mounted a pair of blocks 138. The confronting surfaces of these blocks are bored to form a circular aperture to receive an eccentric 140 fixed to a shaft 141 journalled in the cabinet and having an operating handle 142 on the outer end thereof, see Figures 6 and 7.

The arm 131 is biased by tension spring 144 to place the band 34 under tension whereby there is no slack in the band. After the drums 44, 55 have been rotated to bring the selected end in juxtaposition with the optical system, the drums are automatically locked by the pins 92, 98. Thereafter, rotation of the shaft 141 by the handle 142 will move the arm 137 about its pivot 146. When the arm is moved in a counter-clockwise direction, Figures 4 and 7, further tension will be placed upon that portion of the band attached to the upper rail 35 of the frame 22 causing the frame 22 to move upwardly against the tension of the spring 144. The operative arrangement of the eccentric 140, arm 137 and roller 136 is such that upon a slight movement of the handle 142, a very minute movement is imparted to the frame 22. It will be apparent that rotation of the eccentric 140 to move the arm 137 in a clockwise direction will result in the frame 22 moving downwardly under the tension of spring 144.

A similar arrangement is provided for the band 50 consisting of a roller 150 journalled in an arm 151 pivoted at its opposite end, as at 152, and an arm 153 pivoted at 154 and having a roller 155, this arm being operated by the eccentric 156, shaft 157 and handle 158.

With this sensitive construction, the operator can impart a very slight movement either vertically or horizontally to the film to bring the selected image into registration with the optical system.

What I claim is:

1. Apparatus for viewing an image on a flat film having a multiplicity of images thereon, comprising a viewing screen, a light source, an optical system, a frame for supporting a film in said optical system intermediate said screen and light source, said frame being mounted for movement in directions lengthwise and transversely of said film to position various ones of said images in registration with said optical system, a flexible band attached at its ends to opposite sides of said frame and having an intermediate portion engaging the periphery of a drum journalled for rotation, said flexible member and drum being cooperable upon rotation of the drum to move the film frame in a direction lengthwise of the film, a second flexible member attached at its ends to the opposing opposite sides of the frame and having an intermediate portion engaging the periphery of a second drum journalled coaxially with said first drum, said second drum and flexible member being cooperable to move the film frame in a direction transversely of the film, a pair of manually operable controls connected to said drums individually, a dial carried by one control, a transparent dial carried by the other control and overlying said first dial, and indicia carried by said dials and cooperable to indicate the selected image positioned in said optical system.

2. Apparatus for viewing an image on a flat film having a multiplicity of images thereon, comprising a viewing screen, a light source, an optical system, a frame for supporting a film in said optical system intermediate said screen and light source, a drum journalled for rotation, a flexible band looped about said drum and being cooperable upon rotation of the drum to move said frame in a direction lengthwise of the film, a second drum journalled for rotation and a second flexible band looped about said second drum and being operable upon rotation of said second drum to move said frame in a direction transversely of the film, stop members for said drums each yieldably held in position for securing engagement with the drum with which it cooperates, and means for individually moving said stop members out of securing engagement with the drums with which they engage and temporarily holding one stop member in its releasing position while the other stop member remains in securing engagement with the companion drum.

3. Apparatus for viewing an image on a flat film having a multiplicity of images thereon, comprising a viewing screen, a light source, an optical system, a film supporting frame mounted in said optical system intermediate the light source and said screen, a drum journalled for rotation, a pair of arms pivotally mounted at like ends and being provided at their opposite ends with rollers, a flexible band trained over a portion of the periphery of said drum and being connected at its ends to said frame, said band being also trained about said rollers, and means yieldingly urging one of said arms about its pivot to tension said band, said band being cooperable upon rotation of the drum to move said frame in a direction lengthwise of the film, manually operable means for effecting pivotal movement of said second arm to cause movement of said band independently of said drum.

4. Apparatus for viewing an image on a flat film having a multiplicity of images thereon, comprising a viewing screen, a light source, an optical system, a frame for supporting a film in said optical system intermediate said screen and light source, said frame being mounted for movement in directions lengthwise and transversely of said film to position various ones of said images in registration with said optical system, a pair of drums journalled in coaxial relation, a flexible band trained over a portion of the periphery of each of said drums with the ends of the bands being connected to said frame, one of said bands being cooperable upon rotation of the drum over which said band is trained to move said frame in a direction lengthwise of the film, the other of said bands being cooperable upon rotation of said other drum to move the frame in a direction transversely of the film, a roll engaging each of said bands and means operable to yieldingly move said rolls in a direction to tension said bands respectively, a second roll engaging each of said bands and manually operable means for moving said second rolls individually to increase or decrease the tension on said bands respectively.

5. Apparatus for viewing an image on a flat film having a multiplicity of images thereon comprising a viewing screen, a light source, an optical system, a film supporting frame mounted in said optical system intermediate the light source and said screen, a drum journalled for rotation, a flexible band trained over a portion of the periphery of said drum and being connected at its ends to said frame, means operable to effect tension on said band between the portion thereof engaging said drum and one end of the band, an arm pivotally mounted at one end and being provided with a roller at its opposite end engaging the band between that portion engaging the drum and the opposite end of the band, said band being cooperable upon rotation of the drum to effect movement of said frame in a direction parallel to the plane of the film, and manually operable means for effecting pivotal movement of said arm to cause movement of that portion of the band engaged thereby independently of said drum.

DONALD S. McCHESNEY.

References Cited in the file of this patent

UNITED STATES PATENTS

| Number | Name | Date |
|---|---|---|
| 2,260,551 | Boni | Oct. 28, 1941 |
| 2,292,825 | Dilks | Aug. 11, 1942 |
| 2,484,448 | Cook | Oct. 11, 1949 |